United States Patent [19]
Fuhr et al.

[11] Patent Number: 5,137,393
[45] Date of Patent: Aug. 11, 1992

[54] ARRANGEMENT FOR COVERING INCLINED LOOSE MATERIAL SURFACES

[75] Inventors: Hartmut Fuhr, Leverkusen; Bernd Koglin, Bergisch Gladbach; Rolf Rink, Cologne; Josef Schäfer, Leverkusen; Wolfgang Vogel, Siegburg; Rudolf Krause, Buchholz, all of Fed. Rep. of Germany

[73] Assignees: Bayer Aktiengesellschaft, Leverkusen; SLT Lining Technology GmbH, Hamburg, both of Fed. Rep. of Germany

[21] Appl. No.: 668,555

[22] Filed: Mar. 13, 1991

[30] Foreign Application Priority Data

Mar. 19, 1990 [DE] Fed. Rep. of Germany ....... 4008791

[51] Int. Cl.⁵ .................................................. B09B 1/00
[52] U.S. Cl. ..................................... 405/129; 405/128
[58] Field of Search ............... 405/129, 128, 258, 270, 405/18, 19

[56] References Cited
U.S. PATENT DOCUMENTS

| | | |
|---|---|---|
| 3,586,624 | 6/1971 | Larson .......................... 405/129 X |
| 4,519,338 | 5/1985 | Kramer et al. .................. 405/128 X |
| 4,768,897 | 9/1988 | Nussbaumer et al. ............. 405/128 |
| 4,885,201 | 12/1989 | Brandt ............................ 428/402 X |
| 4,973,196 | 11/1990 | Fuhr et al. ....................... 405/129 |
| 5,054,962 | 10/1991 | Bahnmuller et al. .............. 405/129 |

FOREIGN PATENT DOCUMENTS 3802085 7/1989 Fed. Rep. of Germany ...... 405/129

Primary Examiner—Dennis L. Taylor
Attorney, Agent, or Firm—Sprung Horn Kramer & Woods

[57] ABSTRACT

Arrangement for covering the surface, which may be inclined, of loose material, in particular earth or waste dump material, comprising a sealing course which is provided with a top fill. In order to improve the adhesion between the sealing course and the top fill, a rough layer is arranged on the sealing course, on top of the rough layer an adhesive non-woven fabric, which cooperates with the rough layer in an adhesive manner, and on top of the non-woven fabric a retaining mat, which bonds with the top fill. The adhesive non-woven fabric and the retaining mat may be a known geotextile drainage layer which, when reversed, is used for a standard drainage arrangement.

13 Claims, 1 Drawing Sheet

ARRANGEMENT FOR COVERING INCLINED LOOSE MATERIAL SURFACES

BACKGROUND OF THE INVENTION

The invention relates to an arrangement for covering the surface, which may be inclined, of loose material, in particular earth or waste dump material, which arrangement comprises a sealing course with an adhesive roughness at least at the upper side and a top fill on top of this course.

It is known to roughen the upper side of a sealing course in order to improve the adhesion of a supported layer of earth (DE-OS 36 22 559). However the increase in adhesive power which can thus be obtained is limited if the angle of inclination is large, the top material is coarse (gravel) or there are considerable aggressive forces (heavy rain, wind). This applies in particular in the case of large-area coverings, as are found in waste dumps (DE-OS 34 15 729), and a thin top fill, which is desirable in temporary coverings in waste dumps (DE-OS 25 42 999) in order to keep the losses in volume low (DE-OS 36 41 780).

SUMMARY OF THE INVENTION

The principal object of the invention is to improve the adhesion of the top fill to the sealing course.

The solution according to the invention lies in the fact that an adhesive non-woven fabric is arranged directly on the sealing course, the open surface of the fabric which faces the sealing course comprising free fibres whose diameter is smaller than the peak-to-valley height of the sealing course surface, and a retaining mat, which is bonded to the adhesive non-woven fabric, is arranged on the latter, the upper side of which mat comprises depressions which are at least approximately as large as the particle size of a substantial particle fraction of the top fill.

The intermediate layer according to the invention, which consists of the adhesive non-woven fabric and the retaining mat, creates various adhesion requirements to be met by the sealing course on the one hand and the top fill on the other. The fibres of the adhesive non-woven fabric hook onto the surface projections forming the roughness of the sealing course, while the retaining mat with its coarser structure bonds with the top fill.

The adhesive non-woven fabric adheres particularly well to the sealing course if the adhesive roughness of the sealing course surface is formed by projecting bodies which are bonded to the latter and the average height of which is less than 2 mm, advantageously even less than 1 mm. These bodies are advantageously formed by spray particles which are welded to the sealing course surface, as are obtained according to the DE-OS 36 22 559, by propelling liquid thermoplastic material against the surface of the sealing course while simultaneously finely dispersing it. The individual bodies, which are shaped like beads or worms, form a kind of weld joint with the sealing course, which offers them sufficient cohesion, without them basically losing the shape which they have got in the spraying process. They therefore also form undercuts or other irregular shapes, onto which the fibres of the adhesive non-woven fabric can fasten, in particular hook. In order for this fastening or hooking to take place, the fibres of the non-woven fabric must be sufficiently thin and — notwithstanding the fact that they are fastened in the non-woven fabric — able to move sufficiently freely. For example, the non-woven fabric surface may not be levelled by thermal pressing of this fabric or bonded by the multiple bonding of adjacent fibres such that the non-woven fabric surface is smooth, firm and/or largely closed and therefore no free fibre portions are available for cooperation with the sealing course surface. To draw a distinction with respect to unsuitable non-woven fabrics of this kind, the surface of suitable non-woven fabrics is therefore described as open and the fibres adapted in the latter for fastening to the roughness of the sealing course are described as free.

In order to make it all the more easy for the fibres to fasten to the roughness, their diameter is preferably less than one third of the peak-to-valley height of the sealing course surface, preferably in the order of one tenth or less of the peak-to-valley height. The non-woven fabric surface should be soft, so that the fibres can nestle in the roughness depressions.

A particularly good bond with the top fill is achieved if the retaining mat is formed by a coarse non-woven fabric or net, which should have an average fibre or strand spacing which is greater than the smallest substantial particle size of the top fill. Substantial in the sense of the invention means a particle fraction which is contained in the top fill in a quantity which is such that the depressions in the retaining mat — provided they are near the surface and open towards the latter — can be largely (preferably more than 50%) filled by this and by the components of the greater fractions partly penetrating into the depressions. Good results are obtained with a mat whose average fibre spacing is at least 2 mm, if a top fill of earth, sand or gravel (particle size from 2 mm upwards) is used.

Also of great advantage is an arrangement in which the retaining mat has a honeycomb-like impression, i.e. a plurality of depressions which are separated from one another by narrow webs, taper downwards and the dimensions of which are greater than the smallest substantial particle size of the top fill. The average depression dimensions, measured in the mat surface parallel to the mat plane, are advantageously greater than 5 mm.

A retaining mat which comprises fibres or strands of a wire-like rigidity has proved to be particularly advantageous, as this ensures that fastening interspaces are maintained even under the load of the top fill. Low-pressure polyethylene monofilaments, for example, the diameter of which is greater than 0.2 mm and preferably in the order of 0.5 mm, have sufficient rigidity in the sense of this feature.

A good bond between the retaining mat and the top fill can however also be achieved if the retaining mat is particularly soft and flexible, so that individual particles can become embedded in impressed depressions in the mat and fasten therein. These directly fastened particles then lead to further particles being indirectly fastened. In order to be able to produce this effect, the mat should be very soft, i.e. it should be able to be compressed by at least 5 mm by 10 g/cm². It should be at least 10 mm thick.

In order to provide a sufficient fastening volume, the retaining mat should have a cavity volume of at least 90%, preferably at least 95%, in the relaxed state.

A retaining mat which comprises a random laid layer of monofilaments which are bonded together at the intersection points and the thickness of which is at least 1/100 of the mat thickness is advantageous.

The retaining mat and the adhesive non-woven fabric are advantageously firmly bonded together, for example by welding. A firm bond of this kind is unnecessary if their static friction is sufficient without measures of this kind.

Suitable non-woven fabrics and retaining mats are available on the market as geotextiles, i.e. as filter elements or drainage layers. They may also be obtained welded together.

It is known to use geotextiles of this kind on a sealing course in order to form a drainage layer (DE-OS 34 44 895). In this case however — the reverse to the concept of the invention — the coarse drainage layer is arranged at the bottom and the fine non-woven fabric layer at the top. Although the intention here is to apply an earth fill as a vegetation layer, increased adhesion cannot thereby be expected. Welding is provided between the drainage layer and the sealing course, as an increased capacity to slip would otherwise have to be expected at this point.

The non-woven fabric combination according to the invention also permits drainage, as this combination, possibly with a layer of gravel on top, forms adequate drainage cross sections through which water can be removed onto the sealing course lying underneath and delivered to a controlled drain system. This is of particular importance when the arrangement according to the invention is used for temporary seals in waste dumps which should permit drainage and can therefore remain in the body of the waste dump (without subsequently being destroyed). If, on the other hand, there is a risk of the drainage cross sections in the non-woven fabric arrangement being entirely or partly closed due to fine bodies being deposited, it is possible to provide between the adhesive non-woven fabric and the retaining mat a further drainage layer which — in conformity with the prior art — consists of an upper filter layer and a lower coarse non-woven fabric layer. This does not alter the fact that the adhesive layer according to the invention lies directly on the sealing course, while the retaining mat forms the uppermost layer for bonding with the top fill. In general, however, an additional drainage arrangement of this kind is unnecessary and the adhesive non-woven fabric and the retaining mat may be directly bonded together.

BRIEF DESCRIPTION OF THE DRAWING

The invention is explained in detail in the following with reference to the drawing, which shows an embodiment in a diagrammatic vertical section.

DESCRIPTION OF THE PREFERRED EMBODIMENT

Figure 1:
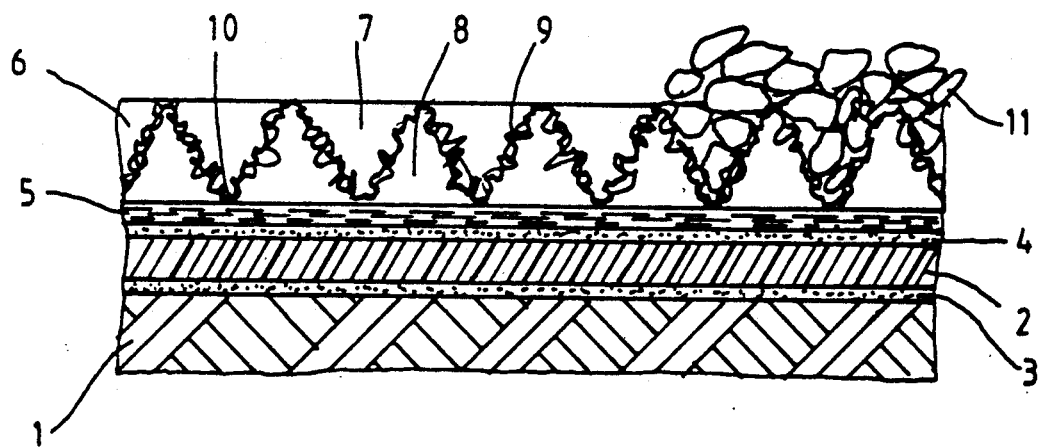

The sealing course 2 is laid on the material 1 to be covered, which may be a waste dump and, if necessary, is provided with gas collectors, which course bears on both surfaces rough layers 3 and 4 formed by particles which are sprayed on and firmly bonded to these surfaces. On top of this course lies the adhesive non-woven fabric 5, which is formed by a geotextile filter layer, i.e. a soft, fine- fibred non-woven polyester fabric which comprises staple fibres having a thickness of less than 0.02 mm and which is just mechanically bonded rather than heat-bonded. On top of this lies the retaining mat 6, which is formed as a random laid layer, comprises filaments of a thickness of 0.5 mm, is between 15 and 20 mm thick and has a square metre weight of 400 grammes. It is impressed with a honeycomb pattern, which means that both sides are provided with staggered depressions 7, 8 of a square tapered shape. In between webs 9, which mainly contain the monofilaments, are formed. The mat 6 is welded or stitched to the non-woven fabric 5 at the points 10.

The top fill 11, which is a gravel fill, is applied to the mat 6.

The rough layer 3 at the underside of the sealing course 2 forms an adhesive bond with the waste dump material 1. The rough layer 4 at the upper side forms an adhesive bond with the adhesive non-woven fabric 5, some of the fibres of which hook onto the particles of the rough layer 4. The retaining mat 6 forms an adhesive bond with the top fill 11. Tests have shown that slopes with a slope angle of 35° can be covered with reliable adhesion by this arrangement even under adverse conditions.

The stamped depressions 7 provided in the example are not absolutely necessary for the adhesive bond with the top fill 11, although they are of advantage. The coarse fibre spacing is usually sufficient for forming the depressions in the mat 6, in which the particles of the top fill 11 can fasten.

A special drainage arrangement between the top fill 11 and the sealing course 2 is not usually necessary, as this function can be adequately performed by the layers 5 and 6. In exceptional cases it is possible to provide between the layers 5 and 6 a further special drainage layer which is sufficiently bonded to these layers.

There has thus been shown and described a novel arrangement for covering inclined loose material surfaces which fulfills all the objects and advantages sought therefore. Many changes, modification, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. In an arrangement for covering a surface, which may be inclined, of loose material, in particular earth or waste dump material, which arrangement comprises a sealing course with an adhesive roughness at least at the upper side and a top fill on top of this course, the improvement wherein an adhesive non-woven fabric (5) is arranged directly on the sealing course (2), the open surface of the fabric which faces the sealing course comprising free fibers whose diameter is smaller than the peak-to-valley height of the sealing course surface (4), and a retaining mat (6), which is bonded to the adhesive non-woven fabric (5), is arranged on the latter, the upper side of which mat comprises depressions (7) which are at least approximately as large as the particle size of a substantial particle fraction of the top fill (11).

2. Arrangement according to claim 1, wherein the adhesive roughness of the surface of the sealing course (2) is formed by projecting bodies which are bonded to the latter and the average height of which is less than 2 mm.

3. Arrangement according to claim 1 wherein the adhesive roughness of the surface of the sealing course (2) is formed by spray particles (3, 4) which are welded to this surface.

4. Arrangement according to claim 1, wherein the surface of the adhesive non-woven fabric (5) which faces the sealing course (2) comprises fibers whose diameter is less than one third of the average peak-to-valley height of the rough layer (4) of the sealing course (2).

5. Arrangement according to claim 1, wherein the retaining mat (6) is a coarse non-woven fabric or net.

6. Arrangement according to claim 5, wherein the non-woven fabric or net has an average fiber or strand spacing which is greater than the smallest substantial particle size of the top fill (11).

7. Arrangement according to claim 5, wherein the average fiber spacing of the retaining mat is at least 1 mm.

8. Arrangement according to claim 1, wherein the retaining mat comprises stamped depressions (7) whose dimensions are greater than the smallest substantial particle size of the top fill (11).

9. Arrangement according to claim 8, wherein the average depression dimensions, measured parallel to the mat plane, are at least 5 mm.

10. Arrangement according to claim 5, wherein the fibers forming the upper side of the retaining mat (6) are of a wire-like rigidity.

11. Arrangement according to claim 1, wherein the retaining mat is at least 10 mm thick and soft, i.e. it can be compressed by at least 5 mm by 10 g/cm$^2$.

12. Arrangement according to claim 5, wherein the retaining mat has a cavity volume of at least 90%, preferably at least 95%, in the relaxed state.

13. Arrangement according to claim 1, wherein the retaining mat (6) and the adhesive non-woven fabric (5) are firmly bonded together.

* * * * *